United States Patent
Funabashi (10) Patent No.: US 9,501,879 B2
(45) Date of Patent: Nov. 22, 2016

(54) SEMICONDUCTOR INTEGRATED CIRCUIT MOUNTABLE ON RECORDING DEVICE AND METHOD OF OPERATING THE SAME

(75) Inventor: Yutaka Funabashi, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 693 days.

(21) Appl. No.: 13/355,061

(22) Filed: Jan. 20, 2012

(65) Prior Publication Data

US 2012/0188375 A1 Jul. 26, 2012

(30) Foreign Application Priority Data

Jan. 20, 2011 (JP) ................ 2011-009471

(51) Int. Cl.
| | |
|---|---|
| H04N 7/18 | (2006.01) |
| G07C 5/08 | (2006.01) |
| H04N 19/105 | (2014.01) |
| H04N 19/61 | (2014.01) |
| H04N 19/167 | (2014.01) |
| H04N 19/59 | (2014.01) |

(52) U.S. Cl.
CPC .......... *G07C 5/0866* (2013.01); *H04N 19/105* (2014.11); *H04N 19/167* (2014.11); *H04N 19/59* (2014.11); *H04N 19/61* (2014.11)

(58) Field of Classification Search
None
See application file for complete search history.

(56) References Cited

U.S. PATENT DOCUMENTS

| | | | | |
|---|---|---|---|---|
| 6,636,257 B1 * | 10/2003 | Harada et al. | ................ | 348/148 |
| 2002/0090207 A1 * | 7/2002 | Mishima et al. | ............. | 386/111 |
| 2008/0187047 A1 * | 8/2008 | Stephan et al. | .......... | 375/240.16 |

FOREIGN PATENT DOCUMENTS

JP 2005-323021 A 11/2005

* cited by examiner

*Primary Examiner* — Heather Jones
(74) *Attorney, Agent, or Firm* — McGinn IP Law Group, PLLC

(57) ABSTRACT

A semiconductor integrated circuit has a video encoder including a motion prediction unit, a motion compensation unit, a subtraction unit, a discrete cosine transform unit, a quantization unit, an inverse quantization unit, an inverse discrete cosine transform unit, and an addition unit. The encoder divides the video signal from the camera into a plurality of partial images including the central part of the image and the peripheral part of the image according to the distance from the center of the image, and processes the partial images. A pixel processing unit coordinate-transforms coordinates of a pixel included in the central part of the image into coordinates of the peripheral part of the image, and performs a process of enlarging an object of a subject included in the central part of the image on a pixel-by-pixel basis when performing the coordinate transform.

21 Claims, 6 Drawing Sheets

SEMICONDUCTOR INTEGRATED CIRCUIT MOUNTABLE ON RECORDING DEVICE AND METHOD OF OPERATING THE SAME

CROSS-REFERENCE TO RELATED APPLICATION

The disclosure of Japanese Patent Application No. 2011-9474 filed on Jan. 20, 2011 including the specification, drawings and abstract is incorporated herein by reference in its entirety.

BACKGROUND

The present invention relates to a semiconductor integrated circuit which is mountable on a recording device such as a drive recorder and a method of operating the same, and particularly to a technology which is effective to reduce the processing load and power consumption when recording video images of a large number of subjects moving from generally the center of the image toward the peripheral part of the image.

Conventionally, when an accident of a vehicle such as an automobile occurs, it is not rare that a dispute with regard to fact finding associated with the accident arises among the parties concerned. It often happens that allegations of the parties concerned conflict as to whether the traffic signal was green or red, or whether there was a sudden dash.

An aircraft, in contrast, has mounted thereon a driving situation recording device called a flight recorder, and data of the recorded driving situation is used as important evidence when investigating the cause of an aircraft accident.

Accordingly, as with the flight recorder equipped in an aircraft, there has been proposed a drive recorder also for a vehicle such as an automobile, which records a few dozen seconds long video before and after an accident occurs, in place of an eyewitness at the time of the accident.

For example, the drive recorder records digital video signals and digital audio signals as drive recorder information respectively output from a vehicle-mounted camera and a vehicle-mounted microphone to a hard disk drive (HDD) of a vehicle-mounted recording medium.

The following patent document 1 (Japanese Patent Laid-Open No. 2005-323021) describes, for a vehicle-mounted imaging system which captures images of a subject in front of the running direction while the vehicle is running in which an object included generally in the center of an image captured at the current capture timing appears at the next capture timing as an enlarged object that has been moved toward the peripheral part of the image, detecting an optical flow of the stationary subject using the moving speed of the vehicle detected by a vehicle speed detecting unit, moving respective objects included in the images captured by the imaging system using the optical flow, and compressing the images by calculating the difference between the image in which the object has been moved and the image in the next frame.

The vehicle-mounted imaging system described in the following patent document 1 includes a characteristic point extraction unit and an positioning unit so that the characteristic point extraction unit extracts a characteristic point of the image in which the object has been moved and a characteristic point of the image in the next frame, and the positioning unit moves the object again in order to position the characteristic points, extracted by the characteristic point extraction unit, of the image in which the object has been moved. Included in the characteristic points extracted by the characteristic point extraction unit are: edges, particular straight lines and curves, particular shapes, or regions having particular colors.

SUMMARY

Before making the present invention, the inventors had been engaged in development of a semiconductor integrated circuit which is mountable on a drive recorder.

Before making the present invention, the inventors had examined in detail the vehicle-mounted imaging system described in the patent document 1. As a result of the examination by the inventors, a problem has been revealed that, since characteristic point extraction by the characteristic point extraction unit is required to perform image compression in the vehicle-mounted imaging system described in the patent document 1, the processing load and power consumption of the vehicle-mounted imaging system are large for extracting characteristic points of objects of all the stationary subjects moving from generally the center of the image toward the peripheral part of the image.

The present invention has been made as a result of the examination by the inventors prior to the present invention as described above.

Therefore, it is a purpose of the present invention to reduce the processing load and power consumption when recording video images of a large number of subjects moving from generally the center of the image toward the peripheral part of the image.

The other purposes and the new feature of the present invention will become clear from the description of the present specification and the accompanying drawings.

The following explains briefly the outline of a typical invention among the inventions disclosed in the present application.

A semiconductor integrated circuit (ENC) according to a representative embodiment of the present invention has a video encoder including a motion prediction unit (2), a motion compensation unit (4), a subtraction unit (3), a discrete cosine transform unit (51), a quantization unit (52), an inverse quantization unit (61), an inverse discrete cosine transform unit (62), and an addition unit (63).

The video encoder divides the video signal from the camera into a plurality of partial images including the central part of the image and the peripheral part of the image according to the distance from the center of the image, and processes the partial images.

The video encoder further includes a pixel processing unit (64) connected between the output of the addition unit and the other input of the motion compensation unit.

The pixel processing unit coordinate-transforms coordinates of a pixel included in the central part of the image in the reference image of the output of the addition unit into coordinates of the peripheral part of the image.

Figure 1:
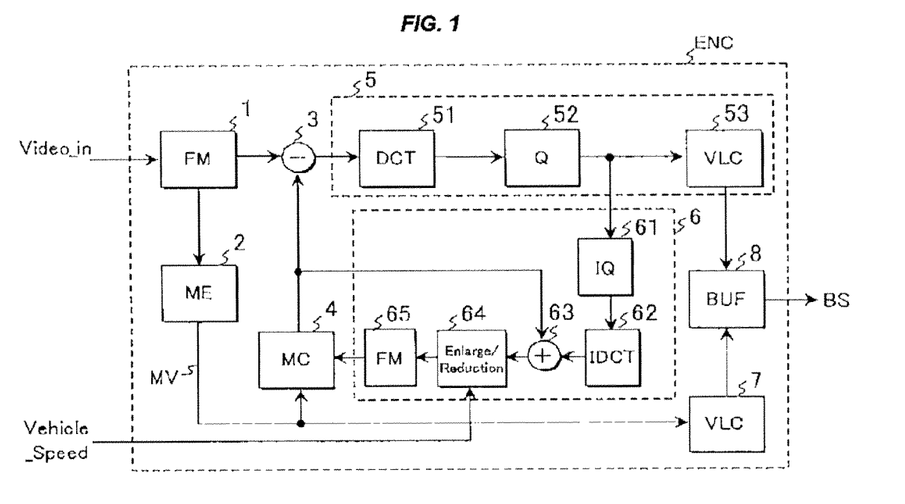
FIG. 1 illustrates a configuration of a semiconductor integrated circuit ENC which is mountable on a drive recorder according to an embodiment 1 of the present invention.
Figure 2:
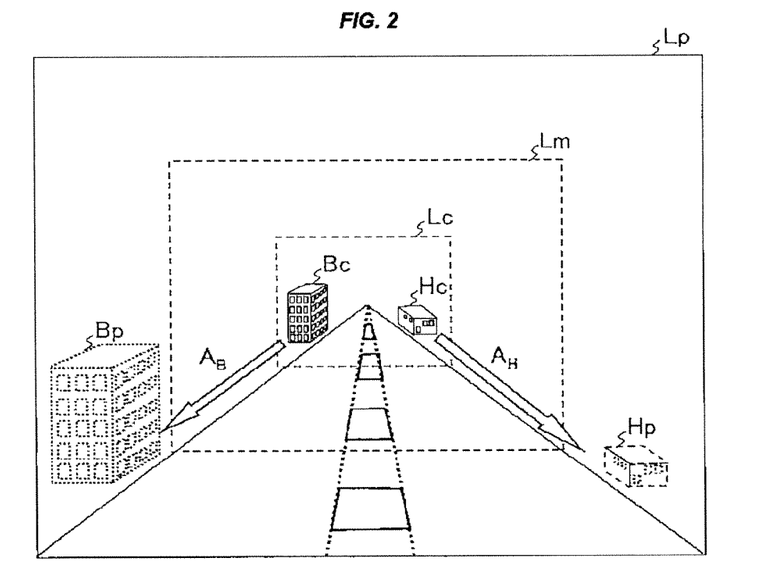
FIG. 2 illustrates how a large number of subjects move from generally the center of the image toward the peripheral part of the image when capturing video images in front of the vehicle with a vehicle front camera of a drive recorder having mounted thereon the semiconductor integrated circuit ENC according to the embodiment 1 of the present invention shown in FIG. 1.

The pixel processing unit is characterized by performing a process of enlarging an object of a subject included in the central part of the image on a pixel-by-pixel basis when performing the coordinate transform (see FIGS. 1 and 2).

The following explains briefly the effect acquired by the typical invention among the inventions disclosed in the present application.

According to the present invention, the processing load and power consumption can be reduced when recording video images of a large number of subjects moving from generally the center of the image toward the peripheral part of the image.

DETAILED DESCRIPTION

1. Outline of Embodiments

First, representative embodiments of the invention disclosed in the application will be described. Reference numerals in the drawings, referred to with parentheses in the outline explanation of representative embodiments, are only illustrative of what is included in the spirit of the components to which the numerals are provided.

[1] A semiconductor integrated circuit (ENC) according to a representative embodiment of the present invention has a video encoder including a motion prediction unit (2), a motion compensation unit (4), a subtraction unit (3), a discrete cosine transform unit (51), a quantization unit (52), an inverse quantization unit (61), an inverse discrete cosine transform unit (62), and an addition unit (63).

The motion prediction unit generates, in response to a video signal from a camera, a motion vector from the video signal, and the motion prediction unit supplies the motion vector to one input of the motion compensation unit.

The video signal from the camera can be supplied to one input of the subtraction unit, the output of the subtraction unit can be supplied to the input of the discrete cosine transform unit, the output of the discrete cosine transform unit can be supplied to the input of the quantization unit, the output of the quantization unit can be supplied to the input of the inverse quantization unit, the output of the inverse quantization unit can be supplied to the input of the inverse discrete cosine transform unit, the output of the inverse discrete cosine transform unit can be supplied to one input of the addition unit, a reference image of the output of the addition unit can be supplied to the other input of the motion compensation unit, and a motion compensation prediction signal of the output of the motion compensation unit can be supplied to the other input of the subtraction unit and the other input of the addition unit.

The video encoder divides the video signal from the camera into a plurality of partial images including the central part of the image and the peripheral part of the image according to the distance from the center of the image, and processes the partial images.

The video encoder further includes a pixel processing unit (64) connected between the output of the addition unit and the other input of the motion compensation unit.

The pixel processing unit coordinate-transforms coordinates of a pixel included in the central part of the image in the reference image of the output of the addition unit into coordinates of the peripheral part of the image.

The pixel processing unit is characterized by performing a process of enlarging an object of a subject included in the central part of the image on a pixel-by-pixel basis when performing the coordinate transform (see FIGS. 1 and 2).

According to the embodiment, the processing load and power consumption can be reduced when recording video images of a large number of subjects moving from generally the center of the image toward the peripheral part of the image.

In a preferred embodiment, the camera is a vehicle front camera which captures video images in front of the vehicle.

It is characterized in that the amount of movement of the pixel due to the coordinate transform of the pixel from the central part of the image toward the peripheral part of the image, and the enlargement factor of the object of the subject moving from the central part of the image to the peripheral part of the image are calculated by the pixel processing unit which responds to vehicle speed information from a vehicle speed measurement unit mounted on the vehicle (see FIGS. 3 to 6).

Figure 3:
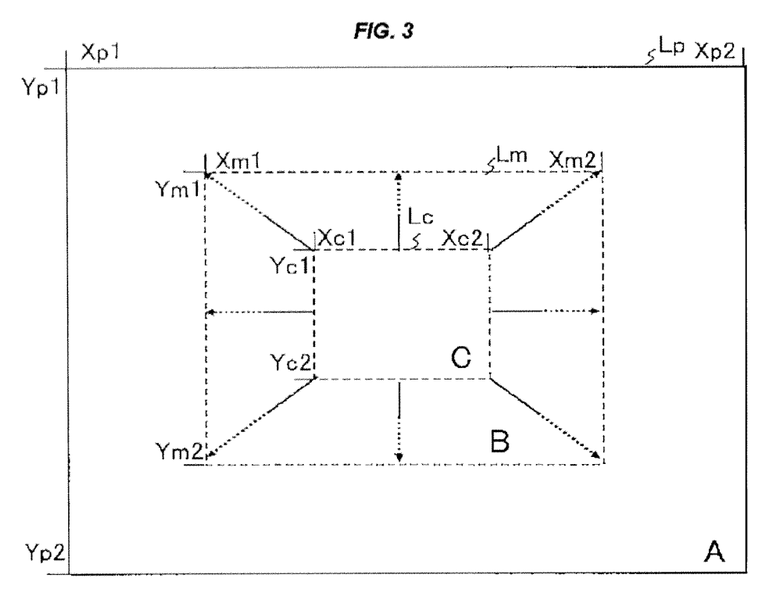
FIG. 3 illustrates how a reference image is generated for the next frame from a image captured at the current timing when the video in front of the vehicle is captured by the vehicle-mounted front camera of the drive recorder having mounted thereon the semiconductor integrated circuit ENC according to the embodiment 1 of the present invention shown in FIG. 1.
Figure 4:
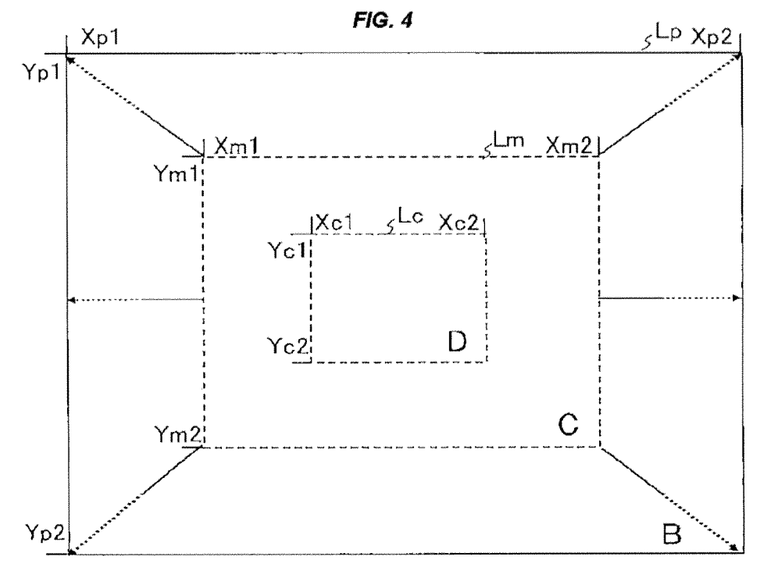
FIG. 4 illustrates the captured image in front of the vehicle at the next timing of the current timing when the image shown in FIG. 3 is captured.

In another preferred embodiment, the video encoder is characterized by dividing the video signal from the camera into the central part of the image, the peripheral part of the image, and an intermediate part of the image between the central part and the peripheral part, and processing the respective parts (see FIGS. 2, 3, and 4).

In still another preferred embodiment, the video encoder is characterized by further including a first memory (1) connected to the one input of the subtraction unit and the input of the motion prediction unit to store the video signal from the camera, and a second memory (65) connected between the output of the pixel processing unit and the other input of the motion compensation unit to store an output image signal of the pixel processing unit (see FIG. 1).

In a more preferred embodiment, the video encoder further includes a first variable-length encoding unit (53), a second variable-length encoding unit (7), and a buffer unit (8).

The output of the quantization unit can be supplied to the input of the first variable-length encoding unit, and the motion vector generated by the motion prediction unit can be supplied to the input of the second variable-length encoding unit.

It is characteristic in that the output of the first variable-length encoding unit and the output of the second variable-length encoding unit can be supplied to one input and the other input of the buffer unit, respectively, and in that the output of the buffer unit can be recorded on a recording medium (see FIG. 1).

In a specific embodiment, the video encoder includes a first video encoder (B-ENC) and a second video encoder (OB-ENC).

The first video encoder processes an object of a stationary subject, which is the subject moving from the central part of the image toward the peripheral part of the image.

Figure 7:
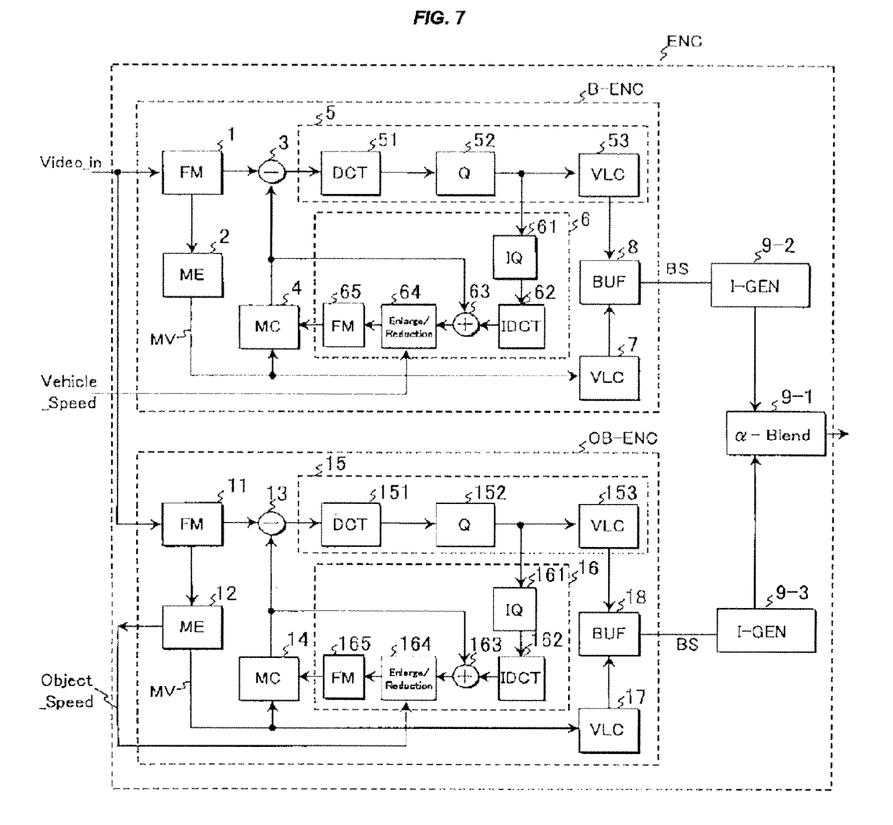
FIG. 7 illustrates a configuration of another semiconductor integrated circuit ENC which is mountable on a drive recorder according to an embodiment 2 of the present invention.

The second video encoder is characterized by processing an object of a moving subject, which is the subject moving from the central part of the image toward the peripheral part of the image (see FIG. 7).

In a more specific embodiment, the semiconductor integrated circuit is characterized by further including an image synthesizing unit (9) which synthesizes a first video encoded signal generated by the first video encoder and a second video encoded signal generated by the second video encoder (see FIG. 7).

In the most specific embodiment, the output of the image synthesizing unit (9) is characterized by being recordable on a recording medium (see FIG. 7).

[2] A representative embodiment of the present invention from another viewpoint is a method of operating the semiconductor integrated circuit (ENC) having the video encoder including the motion prediction unit (2), the motion compensation unit (4), the subtraction unit (3), the discrete cosine transform unit (51), the quantization unit (52), the inverse quantization unit (61), the inverse discrete cosine transform unit (62), and the addition unit (63).

The motion prediction unit generates, in response to the video signal from the camera, a motion vector from the video signal, and the motion prediction unit supplies the motion vector to one input of the motion compensation unit.

The video signal from the camera can be supplied to one input of the subtraction unit, the output of the subtraction unit can be supplied to the input of the discrete cosine transform unit, the output of the discrete cosine transform unit can be supplied to the input of the quantization unit, the output of the quantization unit can be supplied to the input of the inverse quantization unit, the output of the inverse quantization unit can be supplied to the input of the inverse discrete cosine transform unit, the output of the inverse discrete cosine transform unit can be supplied to one input of the addition unit, a reference image of the output of the addition unit can be supplied to the other input of the motion compensation unit, a motion compensation prediction signal of the output of the motion compensation unit can be supplied to the other input of the subtraction unit and the other input of the addition unit.

The video encoder divides the video signal from the camera into a plurality of partial images including the central part of the image and the peripheral part of the image according to the distance from the center of the image, and processes the partial images.

The video encoder further includes the pixel processing unit (64) connected between the output of the addition unit and the other input of the motion compensation unit.

The pixel processing unit coordinate-transforms coordinates of a pixel included in the central part of the image in the reference image of the output of the addition unit into coordinates of the peripheral part of the image.

The pixel processing unit is characterized by performing a process of enlarging an object of a subject included in the central part of the image on a pixel-by-pixel basis when performing the coordinate transform (see FIGS. 1 and 2).

According to the embodiment, the processing load and power consumption can be reduced when recording video images of a large number of subjects moving from generally the center of the image toward the peripheral part of the image.

2. Details of Embodiments

Next, the embodiments will be described in more detail. In all the drawings for explaining the best embodiments, the same symbol is attached to the same member, as a principle, and the repeated explanation thereof is omitted.

Embodiment 1

Configuration of Semiconductor Integrated Circuit Mountable on Drive Recorder

FIG. 1 illustrates a configuration of a semiconductor integrated circuit ENC which is mountable on a drive recorder according to an embodiment 1 of the present invention.

The semiconductor integrated circuit ENC which is mountable on the drive recorder according to the embodiment 1 of the present invention shown in FIG. 1 includes a first frame memory 1, a motion prediction unit 2, a subtraction unit 3, a motion compensation unit 4, a residual encoding unit 5, a local decoding unit 6, a motion vector variable-length encoding unit 7, and a buffer unit 8.

The residual encoding unit 5 includes a discrete cosine transform unit (DCT) 51, a quantization unit (Q) 52, and a residual variable-length encoding unit 53, and the local decoding unit 6 includes an inverse quantization unit (IQ) 61, an inverse discrete cosine transform unit (IDCT) 62, an addition unit (+) 63, a pixel enlargement/reduction unit 64, and a second frame memory 65.

A video signal Video_in from a vehicle front camera which captures video images in front of the vehicle such as an automobile is stored within the first frame memory 1 of the semiconductor integrated circuit ENC. The motion prediction unit 2 generates a motion vector MV from the video signal Video_in stored in the first frame memory 1, and the motion vector MV is supplied to the motion compensation unit 4 and the motion vector variable-length encoding unit 7. While the video signal being read from the first frame memory 1 according to the encoding order is supplied to one input terminal of the subtraction unit 3, a compensation prediction signal is supplied from the motion compensation unit 4 to the other input terminal of the subtraction unit 3, so that a predicted residual generated from the output of the subtraction unit 3 is supplied to the residual encoding unit 5.

In the residual encoding unit 5, the predicted residual from the output of the subtraction unit 3 is quantized by the quantization unit (Q) 52, after having been subjected to discrete cosine transform, which is an orthogonal transform, by the discrete cosine transform unit (DCT) 51. The quantized residual signal of the quantization unit (Q) 52 of the residual encoding unit 5 is encoded by the residual variable-length encoding unit 53, and the residual variable-length encoding signal generated from the residual variable-length encoding unit 53 is supplied to one input terminal of the buffer unit 8. In addition, the quantized residual signal of the quantization unit 52 of the residual encoding unit 5 is subjected to inverse discrete cosine transform by the inverse discrete cosine transform unit (IDCT) 62, after having been subjected to inverse quantization by the inverse quantization unit (IQ) 61 of the local decoding unit 6. While the inverse discrete cosine residual signal of the inverse discrete cosine transform unit (IDCT) 62 is supplied to one input terminal of the addition unit (+) 63, a motion compensation prediction signal from the motion compensation unit 4 is supplied to the other input terminal of addition unit (+) 63, so that the reference image generated from the output of addition unit (+) 63 is stored in the second frame memory 65 via the pixel enlargement/reduction unit 64. Therefore, the motion compensation unit 4 generates a motion compensation prediction signal from the reference image stored in the second frame memory 65 and the motion vector MV supplied from the motion prediction unit 2. In addition, supplying the motion vector MV generated by the motion prediction unit 2 to the motion vector variable-length encoding unit 7 causes the motion vector variable-length encoding unit 7 to generate a motion vector variable-length encoded signal, which is then supplied to the other input terminal of the buffer unit 8. Therefore, a video compression bit stream BS is generated from the output terminal of the buffer unit 8, and the video compression bit stream BS is recorded in a vehicle-mounted recording medium including a hard disk drive (HDD) or a semiconductor nonvolatile memory, which are not shown in FIG. 1.

The configuration of the semiconductor integrated circuit ENC which is mountable on the drive recorder according to the embodiment 1 of the present invention shown in FIG. 1 is identical to the configuration of the well-known MPEG (Moving Picture Experts Group) video encoder except for the pixel enlargement/reduction unit 64 of the local decoding unit 6.

<<Outline of Video Encoding Operation by Semiconductor Integrated Circuit>>

The semiconductor integrated circuit ENC according to the embodiment 1 of the present invention shown in FIG. 1 divides a video signal from a vehicle front camera which captures video images in front of the vehicle such as an automobile into a plurality of partial images including the central part of the image and the peripheral part of the image according to the distance from the center of the image. In order to generate a peripheral reference image for the peripheral part of the image from the captured central image of the central part of the image, a central reference image is generated from the captured central image, by processing the captured central image respectively by the discrete cosine transform unit (DCT) 51, the quantization unit (Q) 52, the inverse quantization unit (IQ) 61, and the inverse discrete cosine transform unit (IDCT) 62.

The pixel enlargement/reduction unit 64 of the semiconductor integrated circuit ENC transforms coordinates of a pixel included in the central reference image to coordinates of a peripheral part of the image in order to move the central reference image toward the peripheral part of the image, and also performs a process of enlarging an object of a subject included in the central reference image on a pixel-by-pixel basis. The amount of movement of pixels due to coordinate transform of the pixel from the central part of the image toward the peripheral part of the image and the enlargement factor of the object of the subject moving from the central part of the image toward the peripheral part the image are calculated by the pixel enlargement/reduction unit 64 which responds to the vehicle speed information of the vehicle speed measurement unit.

<<Pixel Enlargement/Reduction Unit>>

The pixel enlargement/reduction unit 64 of the local decoding unit 6 of the semiconductor integrated circuit ENC which is mountable on the drive recorder according to the embodiment 1 of the present invention shown in FIG. 1 is provided particularly in the semiconductor integrated circuit ENC in order to reduce the processing load and power consumption when recording video images of a large number of subjects moving from generally the center of the image toward the peripheral part of the image captured by the vehicle front camera which captures video images in front of the vehicle such as an automobile. In addition, the pixel enlargement/reduction unit 64 has vehicle speed information supplied thereto from the vehicle speed measurement unit such as a speedometer of an automobile or the like.

The pixel enlargement/reduction unit 64 performs a pixel enlargement process when the vehicle-mounted camera is a vehicle front camera, whereas the pixel enlargement/reduction unit 64 performs a pixel reduction process when the vehicle-mounted camera is a vehicle rear camera which captures video images behind the vehicle. When capturing an image of a subject behind the running direction by the vehicle rear camera while the vehicle is running, an object of the peripheral part of the image captured at the current capture timing appears as a reduced object that has moved to generally the center at the next capture timing, and thus a pixel reduction process by the pixel enlargement/reduction unit 64 is required.

Therefore, when the vehicle-mounted camera is mounted on the vehicle as a front camera, the operation mode is set so that the pixel enlargement/reduction unit 64 of the local decoding unit 6 performs a pixel enlargement process. On the contrary, when the vehicle-mounted camera is mounted on the vehicle as a rear camera, the operation mode is set so that the pixel enlargement/reduction unit 64 of the local decoding unit 6 performs a pixel reduction process.

<<Image of Vehicle Front Camera>>

FIG. 2 illustrates how a large number of subjects move from generally the center of the image toward the peripheral part of the image when video images in front of the vehicle are captured by the vehicle front camera of the drive recorder having mounted thereon the semiconductor integrated circuit ENC according to the embodiment 1 of the present invention shown in FIG. 1.

As shown in FIG. 2, the size of an object of a subject in a central part Lc of the image is small, the object of the subject then becomes medium sized in an intermediate part Lm of the image, and the object of the subject is enlarged to a big size in a peripheral part Lp of the image. In other words, although the high-rise building on the left-hand side of the road shown in FIG. 2 is a small-sized object Bc in the central part Lc of the image, it becomes a large-sized object Bp in the peripheral part Lp of the image. Furthermore, the low-rise house on the right-hand side of the road shown in FIG. 2 is a small-sized object Hc in the central part Lc of the image, it becomes a large-sized object Hp in the peripheral part Lp of the image.

Therefore, in order to realize a high image compression rate when capturing video images in front of the vehicle by the vehicle front camera of the drive recorder, it is necessary to enlarge the size of the object of the reference image stored in the second frame memory 65 when the object of the subject is moving from the central part Lc of the image to the intermediate part Lm of the image and further toward the peripheral part Lp of the image.

<<Generation of Reference Image>>

FIG. 3 illustrates how the reference image for the next frame is generated from the image captured at the current timing by capturing video images in front of the vehicle with the vehicle front camera of the drive recorder having mounted thereon the semiconductor integrated circuit ENC according to the embodiment 1 of the present invention shown in FIG. 1.

As shown in FIG. 3, an image of one frame is divided into a first partial image which is the central part Lc of the image, a second partial image which is the intermediate part Lm of the image, and a third partial image which is the peripheral part Lp of the image.

First, the central part Lc of the image which is the first partial image includes pixels in the range of X pixel coordinates Xc1 to Xc2 and Y-system pixel coordinates Yc1 to Yc2. Next, the intermediate part Lm of the image which is the second partial image includes pixels in the range of X-system pixel coordinates Xm1 to Xm2 and Y-system pixel coordinates Ym1 to Ym2 other than the central part Lc of the image which is the first partial image. Finally, the peripheral part Lp of the image which is the third partial image includes pixels in the range of X-system pixel coordinates Xp1 to Xp2 and Y-system pixel coordinates Yp1 to Yp2 other than the intermediate part Lm of the image which is the second partial image.

As for the image captured at the current timing, the central part Lc of the image which is the first partial image includes pixels of a third object C of a subject located at a long distance from the vehicle front, the intermediate part Lm of the image which is the second partial image includes pixels of a second object B of a subject located at an intermediate distance from the vehicle front, and the peripheral part Lp of the image which is the third partial image includes pixels of a first object A of a subject located at a short distance from the vehicle front.

FIG. 4 illustrates an image in front of the vehicle captured at the timing next to the current timing when the image shown in FIG. 3 was captured.

Since the captured image shown in FIG. 4 no longer includes pixels of the first object A of the subject and the pixels of the first object A of the subject have moved outside the captured image shown in FIG. 4, they have disappeared from the captured image of FIG. 4. Instead, pixels of the second object B of the subject that were present in the intermediate part Lm of the image which is the second partial image of FIG. 3 have moved toward the peripheral part Lp of the image which is the third partial image of FIG. 4. Furthermore, pixels of the third object C of the subject that were present in the central part Lc of the image which is the first partial image of FIG. 3 have moved to the intermediate part Lm of the image which is the second partial image of FIG. 4. Moreover, pixels of a fourth object D of a new subject that was not present in the captured image shown in FIG. 3 have appeared in the central part Lc of the image which is the first partial image of FIG. 4.

In FIGS. 3 and 4, the number of pixels in the X-direction and the number of pixels in the Y-direct ion of the peripheral part Lp of the image which is the third partial image are set to 1920 pixels×1080 pixels, which is the HD (High Definition) size having a high precision, for example.

In FIGS. 3 and 4, the number of pixels in the X-direction and the number of pixels in the Y-direction of the central part Lc of the image which is the small-sized first partial image can be set to an arbitrary value, for example. However, in FIGS. 3 and 4, the enlargement factor of the number of pixels in the X-direction and the number of pixels in the Y-direction of the central part Lc of the image which is the small-sized first partial image to the number of pixels in the X-direction and the number of pixels in the Y-direction of the intermediate part Lm of the image which is the intermediate-sized second partial image is determined by vehicle speed information from the vehicle speed measurement unit such as a speedometer of an automobile or the like supplied to the pixel enlargement/reduction unit 64.

<<Coordinate Transform of Pixels>>

Therefore, it is necessary to move the third object C of the subject as an object of the reference image included in the central part Lc of the image which is the first partial image of the captured image of FIG. 3 to the intermediate part Lm which is the second partial image in order to perform image compression of the third object C of the subject moving to the intermediate part Lm of the image which is the second partial image of FIG. 4 with a high image compression rate. Accordingly, coordinates of respective pixels of the central part Lc of the image which is the first partial image of the captured image of FIG. 3 are transformed in particular. In other words, as shown by the arrows in the central part Lc of the image which is the first partial image of the captured image of FIG. 3, coordinates of respective pixels are transformed so that particularly respective pixels inside the central part Lc of the image move to the intermediate part Lm of the image. For example, coordinates of pixels having the X-system pixel coordinates Xc1 and the Y-system pixel coordinates Yc1 existing inside the central part Lc of the image are transformed into coordinates of pixels having the X-system pixel coordinates Xm1 and the Y-system pixel coordinates Ym1. In addition, coordinates of pixels having the X-system pixel coordinates $(Xc1+Xc2)/2$ and the Y-system pixel coordinates Yc1 existing inside the central part Lc of the image are transformed into coordinates of pixels having the X-system pixel coordinates $(Xm1+Xm2)/2$ and the Y-system pixel coordinates Ym1. In addition, coordinates of pixels having the X-system pixel coordinates Xc2 and the Y-system pixel coordinates Yc1 existing inside the central part Lc of the image are transformed into coordinates of pixels having the X-system pixel coordinates Xm2 and the Y-system pixel coordinates Ym1. Coordinates of pixels having the X-system pixel coordinates Xc2 and the Y-system pixel coordinates $(Yc1+Yc2)/2$ existing inside the central part Lc of the image are transformed into coordinates of pixels having the X-system pixel coordinates Xm2 and the Y-system pixel coordinates $(Ym1+Ym2)/2$. In addition, coordinates of pixels having the X-system pixel coordinates Xc2 and the Y-system pixel coordinates Yc2 existing inside the central part Lc of the image are transformed into coordinates of pixels having the X-system pixel coordinates Xm2 and the Y-system pixel coordinates Ym2. In addition, coordinates of pixels having the X-system pixel coordinates $(Xc1+Xc2)/2$ and the Y-system pixel coordinates Yc2 existing inside the central part Lc of the image are transformed into coordinates of pixels having the X-system pixel coordinates $(Xm1+Xm2)/2$ and the Y-system pixel coordinates Ym2. In addition, coordinates of pixels having the X-system pixel coordinates Xc1 and the Y-system pixel coordinates Yc2 existing inside the central part Lc of the image are transformed into coordinates of pixels having the X-system pixel coordinates Xm1 and the Y-system pixel coordinates Ym2. Finally, coordinate of pixels having the X-system pixel coordinates Xc1 and the Y-system pixel coordinates (Yc1+Yc2)/2 existing inside the central part Lc of the image are transformed into coordinates of pixels having the X-system pixel coordinates Xm1 and the Y-system pixel coordinates (Ym1+Ym2)/2.

Particularly, in the semiconductor integrated circuit ENC which is mountable on the drive recorder according to the embodiment 1 of the present invention shown in FIG. 1, the above-mentioned coordinate transform of all the pixels from the central part Lc of the image which is the first partial image of the captured image into the intermediate part Lm of the image which is the second partial image is automatically performed by the pixel enlargement/reduction unit 64 in response to the vehicle speed information of the vehicle speed measurement unit.

It is necessary to move the third object C of the subject as an object of the reference image included in the intermediate part Lm of the image which is the second partial image of the captured image of FIG. 4 toward the peripheral part Lp of the image which is the third partial image in order to perform image compression of the third object C of the subject moving toward the peripheral part Lp of the image which is the third partial image at the next capture timing of the capture timing shown in FIG. 4 with a high image compression rate. Accordingly, coordinates of respective pixels of the intermediate part Lm of the image which is the second partial image of the captured image of FIG. 4 are transformed in particular. In other words, as shown by the arrows in the intermediate part Lm of the image which is the second partial image of the captured image of FIG. 4, coordinates of respective pixels are transformed so that particularly respective pixels inside the intermediate part Lm of the image move toward the peripheral part Lp of the image. For example, coordinates of pixels having the X-system pixel coordinates Xm1 and the Y-system pixel coordinates Ym1 existing inside the intermediate part Lm of the image are transformed into coordinates of pixels having the X-system pixel coordinates Xp1 and the Y-system pixel coordinates Yp1. In addition, coordinates of pixels having the X-system pixel coordinates (Xm1+Xm2)/2 and the Y-system pixel coordinates Ym1 existing inside the intermediate part Lm of the image are transformed into coordinates of pixels having the X-system pixel coordinates (Xp1+Xp2)/2 and the Y-system pixel coordinates Yp1. In addition, coordinates of pixels having the X-system pixel coordinates Xm2 and the Y-system pixel coordinates Ym1 existing inside the intermediate part Lm of the image are transformed into coordinates of pixels having the X-system pixel coordinates Xp2 and the Y-system pixel coordinates Yp1. Coordinates of pixels having the X-system pixel coordinates Xm2 and the Y-system pixel coordinates (Ym1+Ym2)/2 existing inside the intermediate part Lm of the image are transformed into coordinates of pixels having the X-system pixel coordinates Xp2 and the Y-system pixel coordinates (Yp1+Yp2)/2. In addition, coordinates of pixels having the X-system pixel coordinates Xm2 and the Y-system pixel coordinates Ym2 existing inside the intermediate part Lm of the image are transformed into coordinates of pixels having the X-system pixel coordinates Xp2 and the Y-system pixel coordinates Yp2. In addition, coordinates of pixels having the X-system pixel coordinates (Xm1+Xm2)/2 and the Y-system pixel coordinates Ym2 existing inside the intermediate part Lm of the image are transformed into coordinates of pixels having the X-system pixel coordinates (Xp1+Xp2)/2 and the Y-system pixel coordinates Yp2. In addition, coordinates of pixels having the X-system pixel coordinates Xm1 and the Y-system pixel coordinates Ym2 existing inside the intermediate part Lm of the image are transformed into coordinates of pixels having the X-system pixel coordinates Xp1 and the Y-system pixel coordinates Yp2. Finally, coordinates of pixels having the X-system pixel coordinates Xm1 and the Y-system pixel coordinates (Ym1+Ym2)/2 existing inside the intermediate part Lm of the image are transformed into coordinates of pixels having the X-system pixel coordinates Xp1 and the Y-system pixel coordinates (Yp1+Yp2)/2.

Furthermore, in the semiconductor integrated circuit ENC which is mountable on the drive recorder according to the embodiment 1 of the present invention shown in FIG. 1, the above-mentioned coordinate transform of all the pixels from the intermediate part Lm of the image which is the second partial image of the captured image into the peripheral part Lp of the image which is the third partial image is automatically performed by the pixel enlargement/reduction unit 64 which responds to the vehicle speed information of the vehicle speed measurement unit.

<<Enlargement of Object Size>>

On the other hand, it is necessary to enlarge the size of the third object C of the subject as an object of the reference image included in the central part Lc of the image which is the first partial image of the captured image of FIG. 3 in order to perform image compression of the third object C of the subject moving to the intermediate part Lm of the image which is the second partial image of FIG. 4 with a high image compression rate.

Figure 5:
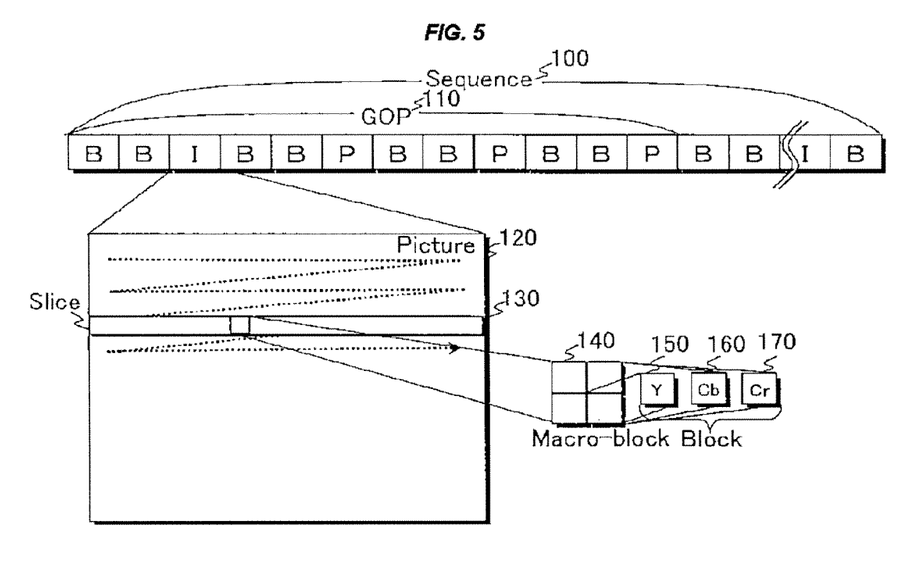
FIG. 5 is an explanatory diagram of a hierarchical structure to a block from a sequence of an encoding process by the video encoding process performed by the semiconductor integrated circuit ENC which is mountable on the drive recorder according to the embodiment 1 of the present invention shown in FIG. 1.

FIG. 5 is an explanatory diagram of a hierarchical structure to a block from a sequence of an encoding process by the video encoding process performed by the semiconductor integrated circuit ENC which is mountable on the drive recorder according to the embodiment 1 of the present invention shown in FIG. 1.

Here, the hierarchical structure from the sequence to the block shown in FIG. 5 is completely identical to the hierarchical structure in the MPEG video encoding.

As shown in FIG. 5, the hierarchical structure from the sequence to the block has a six-tier structure from a Sequence 100 which corresponds to the entire video to Blocks 150, 160 and 170 which are process units of discrete cosine transform (DCT).

In other words, the first tier is the Sequence 100, the second tier is a group of picture (GOP) 110, the third tier is a Picture 120, the fourth tier is a Slice 130, the fifth tier is a Macro-block 140, and the sixth tier is Blocks 150, 160 and 170. The number of Pictures 120 included in the group of picture (GOP) 110, or the number of Macro-blocks 140 included in the Slice 130 is relatively flexible.

As shown in FIG. 5, the Macro-block 140 includes four 8×8 pixel luminance signal blocks 150 which indicate a luminance signal component (Y), one 8×8 pixel blue color-difference signal block 160 which indicates a blue color-difference signal (Cb=B−Y), and one 8×8 pixel red color-difference signal block 170 which indicates a red color-difference signal (Cr=R−Y).

The process with regard to the motion vector MV of the motion prediction unit 2 and the motion compensation unit 4 of the semiconductor integrated circuit ENC which is mountable on the drive recorder according to the embodiment 1 of the present invention shown in FIG. 1 is processed for each macro block 140 shown in FIG. 5. Furthermore, the discrete cosine transform unit 51 of the residual encoding unit 5 and the inverse discrete cosine transform unit 61 of the local decoding unit 6 of the semiconductor integrated circuit ENC both of which are mountable on the drive recorder according to the embodiment 1 of the present invention shown in FIG. 1, process any of one 8×8 pixel luminance signal block 150, one 8×8 pixel blue color-difference signal block 160, and one 8×8 pixel red color-difference signal block 170 as a unit.

On the other hand, the size of the third object C of the subject included in the central part Lc of the image which is the first partial image of the captured image of FIG. 3 is enlarged, on a pixel-by-pixel basis, by the pixel enlargement/reduction unit 64 of the local decoding unit 6 included in the semiconductor integrated circuit ENC according to the embodiment 1 of the present invention of FIG. 1 in order to perform image compression on the third object C of the subject moving to the intermediate part Lm of the image which is the second partial image of FIG. 4 with a high image compression rate.

Figure 6:
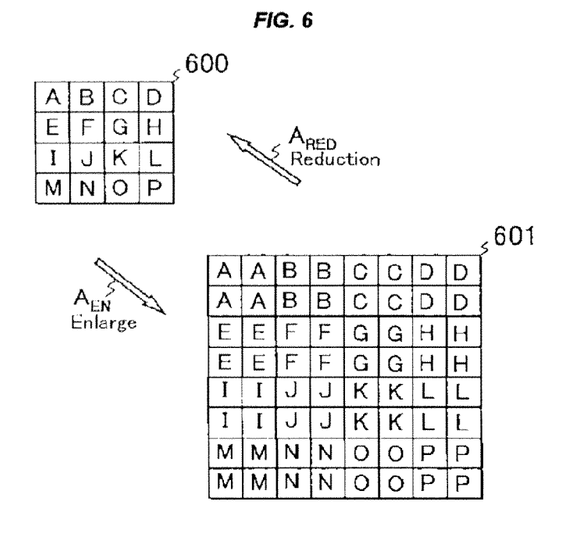
FIG. 6 illustrates how the size of an object of a subject is enlarged and reduced on a pixel-by-pixel basis by a pixel enlargement/reduction unit 64 of a local decoding unit 6 of the semiconductor integrated circuit ENC which is mountable on the drive recorder according to the embodiment 1 of the present invention shown in FIG. 1.

FIG. 6 illustrates how the size of an object of a subject is enlarged and reduced on a pixel-by-pixel basis by a pixel enlargement/reduction unit 64 of a local decoding unit 6 of the semiconductor integrated circuit ENC which is mountable on the drive recorder according to the embodiment 1 of the present invention shown in FIG. 1

FIG. 6 illustrates an object 600 of a small subject existing in the central part Lc of the image which is the first partial image of FIG. 3, and an object 601 of a large subject existing in the intermediate part Lm of the image which is the second partial image of FIG. 3 or the peripheral part Lp of the image which is the third partial image.

First, when enlarging the object size from the object 600 of the small subject to the object 601 of the large subject, a pixel enlargement/interpolation process $A_{EN}$ is performed by the pixel enlargement/reduction unit 64. In other words, the pixel enlargement/reduction unit 64 performs a pixel enlargement process from the object 600 of a small 4×4 pixel subject to the object 601 of a large 8×8 pixel subject, for example, by the pixel enlargement/interpolation process $A_{EN}$. In the pixel enlargement process, one pixel included in the object 600 of the small subject is interpolated in a plurality of pixels, for example 2×2 pixels, of the object 601 of the large subject. The enlargement factor and the interpolation factor in the pixel enlargement/interpolation process $A_{EN}$ by the pixel enlargement/reduction unit 64 are determined by the vehicle speed information from the vehicle speed measurement unit such as a speedometer of an automobile or the like supplied to the pixel enlargement/reduction unit 64.

Next, when reducing the object size from the object 601 of the large subject to the object 600 of the small subject, a pixel reduction/thinning process $A_{RED}$ is performed by the pixel enlargement/reduction unit 64. In other words, the pixel enlargement/reduction unit 64 performs a pixel reduction process from the object 601 of a large 8×8 pixel subject to the object 600 of a small 4×4 pixel subject, for example, by the pixel reduction/thinning process $A_{RED}$. In the pixel reduction process, a plurality of pixels, for example 2×2 pixels of the object 601 of the large subject are thinned to one pixel included in the object 600 of the small subject. The reduction rate and the thinning rate in the pixel reduction/thinning process $A_{RED}$ by the pixel enlargement/reduction unit 64 are determined by the vehicle speed information from the vehicle speed measurement unit such as a speedometer of an automobile or the like supplied to the pixel enlargement/reduction unit 64.

<<Effect by the Embodiment 1 of the Present Invention>>

In the semiconductor integrated circuit ENC according to the embodiment 1 of the present invention which is mountable on the drive recorder described above referring to FIGS. 1 to 6, the captured image is divided into the first partial image which is the small-sized central part Lc of the captured image and the second partial image which is the intermediate part Lm of the large-sized image around thereof. The size enlargement factor from the small-sized first partial image which is the central part Lc of the image to the large-sized second partial image which is the intermediate part Lm of the image is determined by the vehicle speed information from the vehicle speed measurement unit such as a speedometer of an automobile or the like supplied to the pixel enlargement/reduction unit 64.

On addition, the pixel coordinate transform and the pixel enlargement/interpolation process required in that occasion are automatically performed by the pixel enlargement/reduction unit 64 which responds to the vehicle speed information from the vehicle speed measurement unit. In that occasion, the processing load and power consumption of the semiconductor integrated circuit ENC according to the embodiment 1 of the invention can be reduced, since the characteristic point extraction process described in the patent document 1 for extracting edges, particular straight lines and curves, particular shapes, or regions having particular colors can be omitted.

Embodiment 2

Configuration of Another Semiconductor Integrated Circuit

FIG. 7 illustrates a configuration of another semiconductor integrated circuit ENC which is mountable on the drive recorder according to an embodiment 2 of the present invention.

The semiconductor integrated circuit ENC according to the embodiment 2 of the present invention shown in FIG. 7 differs from the semiconductor integrated circuit ENC according to the embodiment 1 of the invention shown in FIG. 1 as follows.

That is, the semiconductor integrated circuit ENC according to the embodiment 2 of the present invention shown in FIG. 7 includes a background image encoding unit B-ENC for processing a image (background image) of all the stationary subjects moving from generally the center of the image toward the peripheral part of the image, an moving object image encoding unit OB-ENC for processing moving objects such as oncoming vehicles and passing vehicles, an image synthesizing unit 9-1, a first image generating unit 9-2 and a second image generating unit 9-3.

The background image encoding unit B-ENC of the semiconductor integrated circuit ENC according to the embodiment 2 of the present invention shown in FIG. 7 includes, in an exactly similar manner as the semiconductor integrated circuit ENC shown in FIG. 1, the first frame memory 1, the motion prediction unit 2, the subtraction unit 3, the motion compensation unit 4, the residual encoding unit 5, the local decoding unit 6, the motion vector variable-length encoding unit 7, and the buffer unit 8, the residual encoding unit 5 including the discrete cosine transform unit (DCT) 51, the quantization unit (Q) 52, and the residual variable-length encoding unit 53, the local decoding unit 6 including the inverse quantization unit (IQ) 61, the inverse discrete cosine transform unit (IDCT) 62, the addition unit (+) 63, the pixel enlargement/reduction unit 64, and the second frame memory 65. Therefore, since the configuration and operation of the background image encoding unit B-ENC of the semiconductor integrated circuit ENC according to the embodiment 2 of the present invention shown in FIG. 7 is exactly identical to the configuration and the operation of the semiconductor integrated circuit ENC shown in FIG. 1, detailed description of the operation of the background image encoding unit B-ENC is omitted here. However, a video compression bit stream of the image (background image) of all the stationary subjects moving from the center of the image toward the peripheral part of the image is generated from the output terminal of the buffer unit 8 and supplied to the input terminal of the first image generating unit 9-2, and image data is generated from the output terminal of the first image generating unit 9-2 and supplied to one input terminal of the image synthesizing unit 9-1.

The moving object image encoding unit OB-ENC of the semiconductor integrated circuit ENC according to the embodiment 2 of the present invention shown in FIG. 7 for processing moving objects such as oncoming vehicles and passing vehicles includes, exactly in a similar manner as the background image encoding unit B-ENC, a first frame memory 11, a motion prediction unit 12, a subtraction unit 13, a motion compensation unit 14, a residual encoding unit 15, a local decoding unit 16, a motion vector variable-length encoding unit 17, and a buffer unit 18, the residual encoding unit 15 including a discrete cosine transform unit (DCT) 151, a quantization unit (Q) 152, and a residual variable-length encoding unit 153, the local decoding unit 16 including an inverse quantization unit (IQ) 161, an inverse discrete cosine transform unit (IQ) 162, an addition unit (+) 163, a pixel enlargement/reduction unit 164, and a second frame memory 165.

The video signal Video_in from the vehicle front camera which captures video images in front of the vehicle such as an automobile is supplied to the first frame memory 11 of the moving object image encoding unit OB-ENC.

The motion prediction unit 12 generates a motion vector MV only for oncoming or passing vehicles from the video signal Video_in stored in the first frame memory 11, and the motion vector MV of the oncoming or passing vehicles is supplied to the motion compensation unit 14 and the vector variable-length encoding unit 17.

Since the moving speed of an oncoming vehicle is faster than the moving speed of a stationary subject moving from generally the center of the image toward the peripheral part of the image, it is possible to distinguish the movement of the oncoming car from the movement of the stationary subject. Since a passing vehicle moves from the peripheral part of the image toward the center of the image whereas the stationary subject moves from generally the center of the image toward the peripheral part of the image, it is possible to distinguish the movement of the passing vehicle from the movement of the stationary subject. In this manner, the motion prediction unit 12 generates the motion vector MV only for the oncoming or passing vehicles and supplies it to the motion compensation unit 14 and the vector variable-length encoding unit 17, while supplying an object moving speed only for the speed of the oncoming vehicle and the speed of the passing vehicle to the pixel enlargement/reduction unit 164.

As a result, the pixel enlargement/reduction unit 164 forms a reference image of the oncoming vehicle by performing the pixel enlargement processing responding to the oncoming vehicle speed with regard to the object of the oncoming vehicle and stores it in the second frame memory 165, while forming a reference image of the passing vehicle by performing the pixel reduction processing responding to the passing vehicle speed with regard to the object of the passing vehicle and storing it in the second frame memory 165. Therefore, the motion compensation unit 14 generates a motion compensation prediction signal only for the oncoming or passing vehicles from the reference image of the oncoming or passing vehicles stored in the second frame memory 165, and from the motion vector MV of the oncoming or passing vehicles supplied from the motion prediction unit 2. Since the video signal being read from the first frame memory 11 according to the encoding order is supplied to one input terminal of the subtraction unit 13 while the motion compensation prediction signal only for the oncoming or passing vehicles is supplied from the motion compensation unit 14 to the other input terminal of the subtraction unit 13, a predicted residual only for the oncoming or passing vehicles generated from the output of subtraction unit 13 is supplied to the residual encoding unit 15. Since no compensation prediction signal is supplied from the motion compensation unit 14 to the other input terminal of subtraction unit 13 with regard to a stationary subject other than the oncoming or passing vehicles, the predicted residual with regard to the stationary subject is ignored because the output of the subtraction unit 13 with regard to the stationary subject is saturated to the maximum output. Therefore, the predicted residual only for the oncoming or passing vehicles from the output of subtraction unit 13 is quantized by the quantization unit (Q) 152 after having been subjected to discrete cosine transform which is an orthogonal transform by the discrete cosine transform unit (DCT) 151. The quantized residual signal only for the oncoming vehicle and the passing vehicle from the quantization unit (Q) 152 of the residual encoding unit 15 is encoded by the residual variable-length encoding unit 153, and the residual variable-length encoding signal only for the oncoming or passing vehicles generated from the residual variable-length encoding unit 153 is supplied to one input terminal of the buffer unit 18. In addition, the motion vector MV of the oncoming or passing vehicles generated from the motion prediction unit 12 is supplied to the motion vector variable-length encoding unit 17 so that a motion vector variable-length encoded signal only for the oncoming or passing vehicles is generated from the motion vector variable-length encoding unit 17 and supplied to the other input terminal of the buffer unit 18. Therefore, a video compression bit stream only for the oncoming or passing vehicles is generated from the output terminal of the buffer unit 18 and supplied to the input terminal of the second image generating unit 9-3, and image data is generated from the output terminal of the second image generating unit 9-3 and supplied to the other input terminal of the image synthesizing unit 9-1.

The image synthesizing unit 9-1, including an alpha blend image processing unit, for example, has a function of image-synthesizing background video data of the video compression bit stream of the image of a stationary subject (background image) supplied from the output terminal of the buffer unit 8 of the background image encoding unit B-ENC and moving object video data of the video compression bit stream only for the oncoming or passing vehicles supplied from the output terminal of the buffer unit 18 of the moving object image encoding unit OB-ENC. Therefore, an image composition video signal including the background video data and the moving object video data of the oncoming or passing vehicles from the image synthesizing unit 9-1 is generated, and recorded on a vehicle-mounted recording medium including for example a hard disk drive (HDD) or a semiconductor nonvolatile memory, which are not shown in FIG. 7.

Figure 8:
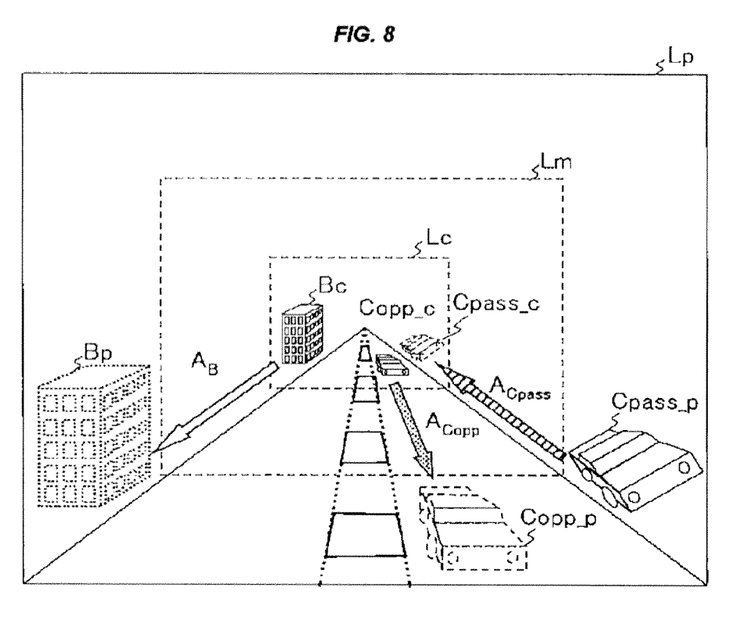
FIG. 8 illustrates how an image of a stationary subject (background image) is captured, together with an oncoming vehicle and a passing vehicle, when capturing video images in front of the vehicle by the vehicle front camera of the drive recorder having mounted thereon the semiconductor integrated circuit ENC according to the embodiment 2 of the present invention shown in FIG. 7.

FIG. 8 illustrates how an image of a stationary subject (background image) is captured, together with an oncoming vehicle and a passing vehicle, when capturing video images in front of the vehicle by the vehicle front camera of the drive recorder having mounted thereon the semiconductor integrated circuit ENC according to the embodiment 2 of the present invention shown in FIG. 7.

In FIG. 8, an image of not only the high-rise building on the left-hand side of the road as with FIG. 2, but also an oncoming vehicle and a passing vehicle is captured on the right-hand side of the road. Although the oncoming vehicle on the right-hand side of the road is a small-sized object Copp_c in the central part Lc of the image, it turns into a large-sized object Copp_p in the peripheral part Lp of the image. Although the passing vehicle on the right-hand side of the road is a large-sized object Cpass_p in the peripheral part Lp of the image, it turns into a small-sized object Cpass_c in the central part Lc of the image.

<<Effect by the Embodiment 2 of the Present Invention>>

In the semiconductor integrated circuit ENC according to the embodiment 1 of the present invention which is mountable on the drive recorder described above referring to FIGS. 7 and 8, the pixel enlargement/reduction unit 164 can form a reference image of an oncoming vehicle by performing the pixel enlargement processing in response to the oncoming vehicle speed with regard to the object of the oncoming vehicle and store it in the second frame memory 165, while forming a reference image of a passing vehicle by performing the pixel reduction processing in response to the passing vehicle speed with regard to the object of the passing vehicle and storing it in the second frame memory 165.

Therefore, according to the embodiment 2 of the present invention, image compression with a high compression rate and image recording with a high image precision are facilitated with regard to oncoming or passing vehicles. Accordingly, it becomes possible, when an accident occurs with driving error of either an oncoming vehicle or a passing vehicle being the main accident cause, to record clearly the driving situation of the oncoming vehicle or the passing vehicle which caused the accident in the drive recorder.

Although the invention made by the inventors has been specifically described based on various embodiments, it is needless to say that the invention is not limited thereto and various modification can be made without deviating from the spirit of the invention.

For example, in the embodiment 1 and the embodiment 2 of the present invention, it is possible to detect the steering angle of the wheel of a vehicle due to steering action associated with driving of the vehicle such as an automobile by a steering angle detector mounted on the vehicle, and compensate the image of a stationary subject (background image) or the moving speed of oncoming or passing vehicles using the detected steering angle. It is also possible on the occasion to compensate the image of a stationary subject (background image), or the direction or inclination of the object of the oncoming or passing vehicles.

Furthermore, the vehicle having the drive recorder according to the present invention mounted thereon is not limited to automobiles using the driving force of an internal combustion engine which burns oil fuel such as gasoline or light oil. It is needless to say that the drive recorder according to the present invention can also be mounted on an electric vehicle using the driving force of a battery-driven electric motor, or a hybrid car employing both an internal combustion engine and an electric motor.

Moreover, the present invention is not limited to a drive recorder mounted on a vehicle such as an automobile. The present invention is also applicable to an auto-zoom mechanism in which the object lens quickly moves in a forward or backward direction of the subject by a battery-driven motor following the camera work of the video camera by the photographer. In other words, the pixel enlargement/reduction unit 64 calculates, in response to the number of rotations of the battery-driven motor corresponding to the moving speed of the focus of the object lens, the amount of movement of pixels due to coordinate transform of pixels from intermediate part of the image toward the peripheral part of the image or the amount of movement of pixels due to coordinate transform of pixels from the peripheral part of the image toward the intermediate part of the image, and the enlargement factor of the objects of the subjects moving from the intermediate part of the image toward the peripheral part of the image or the reduction rate of the objects of the subjects moving from the peripheral part of the image toward the intermediate part of the image.

What is claimed is:

1. A semiconductor integrated circuit including a video encoder comprising a motion prediction unit, a motion compensation unit, a subtraction unit, a discrete cosine transform unit, a quantization unit, an inverse quantization unit, an inverse discrete cosine transform unit, and an addition unit, wherein:

the motion prediction unit generates, in response to a video signal from a camera, a motion vector from the video signal, and the motion prediction unit supplies the motion vector to one input of the motion compensation unit so that, the video signal from the camera can be supplied to one input of the subtraction unit, an output of the subtraction unit can be supplied to an input of the discrete cosine transform unit, an output of the discrete cosine transform unit can be supplied to an input of the quantization unit, an output of the quantization unit can be supplied to an input of the inverse quantization unit, an output of the inverse quantization unit can be supplied to an input of the inverse discrete cosine transform unit, an output of the inverse discrete cosine transform unit can be supplied to one input of the addition unit, a reference image of an output of the addition unit can be supplied to the other input of the motion compensation unit, and a motion compensation prediction signal of an output of the motion compensation unit can be supplied to the other input of the subtraction unit and the other input of the addition unit; and the video encoder divides the video signal from the camera into a plurality of partial images including the central part of the image and the peripheral part of the image according to the distance from the center of the image, and processes the partial images, the video encoder further comprises a pixel processing unit connected between the output of the addition unit and the other input of the motion compensation unit, the pixel processing unit coordinate-transforms coordinates of a pixel included in the central part of the image in the reference image of the output of the addition unit into coordinates of the peripheral part of the image, and the pixel processing unit performs a process of enlarging an object of a subject included in the central part of the image on a pixel-by-pixel basis when performing the coordinate transform, wherein the pixel processing unit responds to speed information to provide compression of the image.

2. The semiconductor integrated circuit according to claim 1, wherein the camera is a vehicle front camera which captures video images in front of the vehicle, and an amount of movement of the pixel due to the coordinate transform of the pixel from the central part of the image toward the peripheral part of the image, and an enlargement factor of the object of the subject moving from the central part of the image to the peripheral part of the image are calculated by the pixel processing unit which responds to the speed information comprising vehicle speed information from a vehicle speed measurement unit mounted on the vehicle to provide the compression of the image.

3. The semiconductor integrated circuit according to claim 2, wherein the video encoder divides the video signal from the camera into the central part of the image, the peripheral part of the image, and an intermediate part of the image between the central part and the peripheral part, and processes the respective parts.

4. The semiconductor integrated circuit according to claim 3, wherein the video encoder further comprises:
   a first memory connected to the one input of the subtraction unit and the input of the motion prediction unit to store the video signal from the camera; and
   a second memory connected between the output of the pixel processing unit and the other input of the motion compensation unit to store an output image signal of the pixel processing unit.

5. The semiconductor integrated circuit according to claim 4,
   wherein the video encoder further comprises a first variable-length encoding unit, a second variable-length encoding unit, and a buffer unit, and
   wherein the output of the quantization unit can be supplied to an input of the first variable-length encoding unit, and the motion vector generated by the motion prediction unit can be supplied to an input of the second variable-length encoding unit; and
   further comprising an output of the first variable-length encoding unit and an output of the second variable-length encoding unit can be supplied to one input and the other input of the buffer unit, respectively, and an output of the buffer unit can be recorded on a recording medium.

6. The semiconductor integrated circuit according to claim 4, wherein:
   the video encoder includes a first video encoder and a second video encoder,
   the first video encoder processes an object of a stationary subject, which is the subject moving from the central part of the image toward the peripheral part of the image, and
   the second video encoder processes an object of a moving subject, which is the subject moving from the central part of the image toward the peripheral part of the image.

7. The semiconductor integrated circuit according to claim 4, further comprising an image synthesizing unit which synthesizes a first video encoded signal generated by the first video encoder and a second video encoded signal generated by the second video encoder.

8. The semiconductor integrated circuit according to claim 7, wherein an output of the image synthesizing unit is recordable on a recording medium.

9. The semiconductor integrated circuit according to claim 1, wherein the video encoder further comprises:
   a first memory connected to the one input of the subtraction unit and the input of the motion prediction unit to store the video signal from the camera; and
   a second memory connected between the output of the pixel processing unit and the other input of the motion compensation unit to store an output image signal of the pixel processing unit.

10. The semiconductor integrated circuit according to claim 1, further comprising a memory unit that separately stores the video signal from the camera in a separate memory area than an output image signal of the pixel processing unit.

11. The semiconductor integrated circuit according to claim 1, further comprising:
    a memory to store an output image signal of the pixel processing unit, the memory being accessible by the motion compensation unit,
    wherein the pixel processing unit transforms coordinates of a pixel included in a central reference image to coordinates of a peripheral part of the image in order to move the central reference image toward a peripheral part of the image,
    and
    wherein the pixel processing unit coordinate-transforms coordinates of a pixel included in the central part of the image in the reference image of the output of the addition unit into coordinates of the peripheral part of the image to perform compression of the image according to the speed information.

12. A method of operating a semiconductor integrated circuit including a video encoder comprising a motion prediction unit, a motion compensation unit, a subtraction unit, a discrete cosine transform unit, a quantization unit, an inverse quantization unit, an inverse discrete cosine transform unit, and an addition unit, the method comprising:
    generating, by the motion prediction unit, in response to a video signal from a camera, a motion vector from the video signal, and the motion prediction region supplies the motion vector to one input of the motion compensation unit so that, the video signal from the camera can be supplied to one input of the subtraction unit, an output of the subtraction unit can be supplied to an input of the discrete cosine transform unit, an output of the discrete cosine transform unit can be supplied to an input of the quantization unit, an output of the quantization unit can be supplied to an input of the inverse quantization unit, an output of the inverse quantization unit can be supplied to an input of the inverse discrete cosine transform unit, an output of the inverse discrete cosine transform unit can be supplied to one input of the addition unit, a reference image of an output of the addition unit can be supplied to the other input of the motion compensation unit, and a motion compensation prediction signal of an output of the motion compensation unit can be supplied to the other input of the subtraction unit and the other input of the addition unit; and
    dividing, by the video encoder, the video signal from the camera into a plurality of partial images including the central part of the image and the peripheral part of the image according to the distance from the center of the image, and processes the partial images,
    wherein the video encoder further comprises a pixel processing unit connected between the output of the addition unit and the other input of the motion compensation unit,
    wherein the pixel processing unit coordinate-transforms coordinates of a pixel included in the central part of the image in the reference image of the output of the addition unit into coordinates of the peripheral part of the image; and performing, by the pixel processing unit, a process of enlarging an object of a subject included in the central part of the image on a pixel-by-pixel basis when performing the coordinate transform, wherein the pixel processing unit responds to speed information to provide compression of the image.

13. The method of operating a semiconductor integrated circuit according to claim 12, wherein:

the camera is a vehicle front camera which captures video images in front of the vehicle, and an amount of movement of the pixel due to the coordinate transform of the pixel from the central part of the image toward the peripheral part of the image, and an enlargement factor of the object of the subject moving from the central part of the image to the peripheral part of the image are calculated by the pixel processing unit which responds to the speed information comprising vehicle speed information from a vehicle speed measurement unit mounted on the vehicle to provide the compression of the image.

14. The method of operating a semiconductor integrated circuit according to claim 13, wherein the video encoder divides the video signal from the camera into the central part of the image, the peripheral part of the image, and an intermediate part of the image between the central part and the peripheral part, and processes the respective parts.

15. The method of operating a semiconductor integrated circuit according to claim 14, wherein the video encoder further comprises:

a first memory connected to the one input of the subtraction unit and the input of the motion prediction unit to store the video signal from the camera; and a second memory connected between the output of the pixel processing unit and the other input of the motion compensation unit to store an output image signal of the pixel processing unit.

16. The method of operating a semiconductor integrated circuit according to claim 15, wherein:

the video encoder further comprises a first variable-length encoding unit, a second variable-length encoding unit, and a buffer unit, and wherein the output of the quantization unit can be supplied to an input of the first variable-length encoding unit, and the motion vector generated by the motion prediction unit can be supplied to an input of the second variable-length encoding unit, and an output of the first variable-length encoding unit and an output of the second variable-length encoding unit can be supplied to one input and the other input of the buffer unit, respectively, and an output of the buffer unit can be recorded on a recording medium.

17. The method of operating a semiconductor integrated circuit according to claim 15, wherein:

the video encoder includes a first video encoder and a second video encoder, the first video encoder processes an object of a stationary subject, which is the subject moving from the central part of the image toward the peripheral part of the image, and the second video encoder processes an object of a moving subject, which is the subject moving from the central part of the image toward the peripheral part of the image.

18. The method of operating a semiconductor integrated circuit according to claim 15, wherein the semiconductor integrated circuit further comprises an image synthesizing unit which synthesizes a first video encoded signal generated by the first video encoder and a second video encoded signal generated by the second video encoder.

19. The method of operating a semiconductor integrated circuit according to claim 18, wherein an output of the image synthesizing unit is recordable on a recording medium.

20. A semiconductor integrated circuit, comprising:

a video encoder including:

a motion prediction unit that generates, in response to a video signal from a camera, a motion vector from the video signal;

a motion compensation unit that receives from the motion prediction unit the motion vector so that, the video signal from the camera that can be outputted;

a subtraction unit that receives the video signal from the output of the motion compensation unit;

an addition unit receiving an output of the subtraction unit, a reference image of an output of the addition unit can be supplied to the motion compensation unit, and a motion compensation prediction signal of an output of the motion compensation unit can be supplied to the subtraction unit and the addition unit, wherein the video encoder divides the video signal from the camera into a plurality of partial images including the central part of the image and the peripheral part of the image according to the distance from the center of the image, and processes the partial images, wherein the video encoder further comprises a pixel processing unit connected between the output of the addition unit and the other input of the motion compensation unit, wherein the pixel processing unit coordinate-transforms coordinates of a pixel included in the central part of the image in the reference image of the output of the addition unit into coordinates of the peripheral part of the image, and wherein the pixel processing unit performs a process of enlarging an object of a subject included in the central part of the image on a pixel-by-pixel basis when performing the coordinate transform, wherein the pixel processing unit responds to speed information to provide compression of the image.

21. The semiconductor integrated circuit according to claim 20, wherein the video encoder further comprises:

a first memory connected to the one input of the subtraction unit and the input of the motion prediction unit to store the video signal from the camera; and a second memory connected between the output of the pixel processing unit and the other input of the motion compensation unit to store an output image signal of the pixel processing unit.

* * * * *